United States Patent [19]

Paice

[11] Patent Number: 5,781,428

[45] Date of Patent: Jul. 14, 1998

[54] TRANSFORMER FOR 12-PULSE SERIES CONNECTION OF CONVERTERS

[76] Inventor: Derek A. Paice, 114 Rosewood Ct., Palm Harbor, Fla. 34685

[21] Appl. No.: 810,482

[22] Filed: Mar. 3, 1997

[51] Int. Cl.$^6$ .................. H02M 7/00; H02M 1/12; H02M 7/06
[52] U.S. Cl. .................. 363/126; 363/3; 363/44
[58] Field of Search .................. 363/3, 4, 39, 44, 363/45, 125, 126, 67, 68

[56] References Cited

U.S. PATENT DOCUMENTS

| | | | |
|---|---|---|---|
| 3,792,286 | 2/1974 | Meier | 307/58 |
| 4,255,784 | 3/1981 | Rosa | 363/129 |
| 4,671,390 | 6/1987 | Stanyard et al. | 187/120 |
| 5,050,058 | 9/1991 | April et al. | 363/65 |
| 5,446,642 | 8/1995 | McMurray | 363/40 |
| 5,446,643 | 8/1995 | McMurray | 363/40 |
| 5,455,759 | 10/1995 | Paice | 363/126 |
| 5,515,264 | 5/1996 | Stacey | 363/132 |

*Primary Examiner*—Peter S. Wong
*Assistant Examiner*—Bao Q. Vu

[57] ABSTRACT

In a multi-pulse converter system a three-phase transformer with tapped wye-connected primary winding and isolated delta-connected secondary winding is used to power two 6-pulse converter bridges connected in series to give 12-pulse operation. The transformer equivalent kVA rating is a fraction, typically less than 60%, of the total dc power. By adjusting the tapping on the wye-connected primary winding the converter dc output voltage is readily adjusted to provide higher or lower dc voltage than is attainable by a three-phase 6-pulse converter. By these means a reliable and versatile 12-pulse converter is obtained which, without additional hardware, gives excellent performance in the face of practical power sources which may incorporate voltage unbalance and pre-existing harmonic voltages.

6 Claims, 7 Drawing Sheets

PRIOR ART
FIGURE 1

TYPICAL AC
LINE CURRENT

DC CIRCUIT WITH
FILTER AND LOAD

SEMICONDUCTORS MAY BE DIODES OR SCRS

LINE-TO-NEUTRAL VOLTAGE = $V_N$

FOR K=0.5, TRANSFORMER VA = 0.58 DC LOAD W.

TABLE OF TYPICAL PERCENTAGE
HARMONIC CURRENTS IN THE AC LINE
INPUT CURRENT $I_{W1}$

WITH INPUT SOURCE HAVING 1%
NEGATIVE SEQUENCE UNBALANCE
VOLTAGE AND 2.5% PRE-EXISTING
FIFTH HARMONIC VOLTAGE.

FIGURE 7

TRANSFORMER FOR 12-PULSE SERIES CONNECTION OF CONVERTERS

FIELD OF THE INVENTION

This invention relates to static AC-to-DC converters such as can be used for AC or DC motors.

BACKGROUND OF THE INVENTION

It is known to use 12-pulse and higher pulse number converters to reduce the amount of harmonic currents drawn from the utility lines when converters are required, however, cost and performance are critical issues. Some schemes which appear favorable on cursory evaluation require additional components at a prohibitive cost to operate properly in practical power systems with voltage unbalance and pre-existing harmonic voltages. This invention enables the desirable rugged performance to be obtained in conjunction with a low cost.

SUMMARY

Multipulse converters provide an effective way to control harmonic currents drawn by power electronic equipments. Numerous patents have addresses the need for unique transformer designs. By way of examples, five are listed below.

| U. Meier | #3,792,286 | Feb. 12, 1974 |
| J. Rosa | #4,255,784 | Mar. 1981 |
| R. Styanyard and Hansruedi | #4,671,390 | Jun. 9, 1987 |
| G. April and G. Olivier | #5,050,058 | Sep. 17, 1991 |
| D. Paice | #5,455,759 | Oct. 3, 1995 |

This invention relates to a tapped-wye, delta, hybrid connection using auto and double wound windings in an effective manner such that two six-pulse converters are conveniently connected in series to provide 12-pulse operation. The manner in which the wye winding is tapped, conveys to the overall scheme certain advantages including minimum use of copper and iron which results in a minimum cost. Typically the transformer has a rating which is 58% of the total dc load. Also the tapping can be easily adjusted to facilitate an appropriate dc output voltage. This feature is of special value in variable frequency drives (VFDs) using a pulse-width-modulated inverter because known modulation methods are barely able to supply an ac output voltage equal to the converter ac line input voltage. Thus motors operate at less than optimum voltage. Further reduction of output occurs when ac line reactance is necessarily included to reduce the disturbances caused by utility voltage transients or reduce high frequency harmonic currents. The new topology described here is easily configured in design to overcome these limitations. Also the 12-pulse characteristics are desirable to reduce the harmonic currents drawn from the utility bus and facilitate compliance with harmonic specifications such as IEEE 519-1992.

Figure 3:
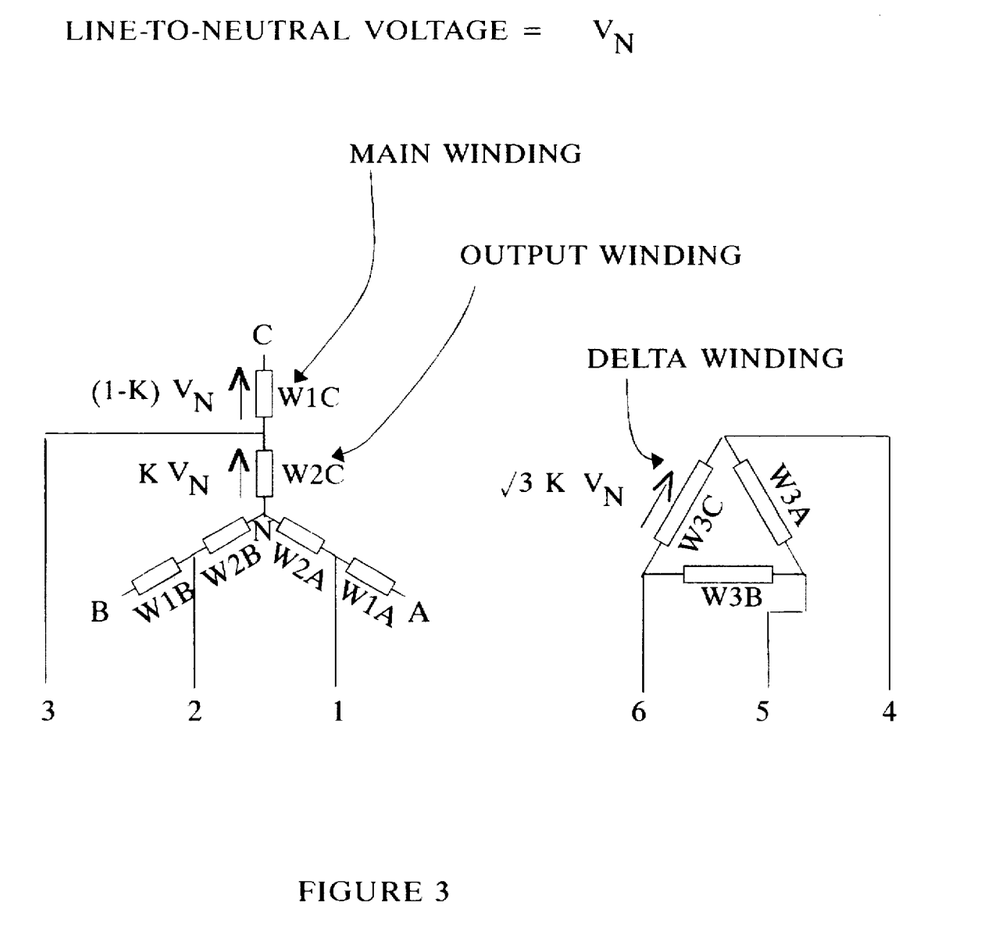
FIG. 3 shows the manner in which the transformer windings are connected in the invention.

The invention resides in a three-phase hybrid transformer, i.e. incorporating auto and double-wound windings in which two separate phase-shifted supplies of nominally equal amplitude but differing in phase by 30° are made available for connecting to two, three-phase bridge converters connected in series. There are three windings on each of the three phases A, B, and C of the transformer, as shown in FIG. 3. The wye winding on the A phase has an upper section W1A called the main winding with fraction (1−K) turns. The main winding is connected to one of the three-phase supply leads A, B, C, and a lower section W2A called the output winding with fraction K turns. Phases B and C are likewise connected. One end of the output winding on each phase is connected to the main winding on that phase and the other end is connected to the other phases to form a neutral connection. The points of connection of the main and output windings provides a three-phase output voltage of K √3 times the ac input line-to-neutral voltage.

A delta winding W3A with nominally √3 K turns is connected in closed fashion with delta windings W3B and W3C from the other phases to provide an isolated three-phase output which is displaced by 30° from the three-phase output available from the points at which the main winding connects to the output winding. These two three-phase voltage sets provide power for two converter bridges connected in series. The series connection of converter bridges is advantageous in that in ensures excellent current sharing within the two converters without extraneous components such as interphase transformers or reactors, such as are needed for most parallel circuits. Also because of the series connection, the new circuit is resistant to the effects of ac line voltages which are unbalanced or have pre-existing harmonic voltages as is often the case in practical ac power systems.

BRIEF DESCRIPTION OF THE DRAWINGS

FIG. 1 shows transformer voltages for a 1:1 output.

FIG. 2 shows a basic three-phase bridge converter which is well known to those in the electronics industry. The ac input line current contains many harmonics which limits the converter application. Maximum dc output voltage $V_{DO}$ is limited to that given by:

$$V_{DO} = 2.339\ V_N.$$

FIG. 4 shows an embodiment of the invention to produce a 12-pulse rectifier with dc output voltage given by:

$$V_{DO} = 4.68\ K\ V_N$$

FIG. 7 shows the ac line current waveform and harmonic content when an ac reactance of 10% is included in series with a practical distorted source of supply voltage feeding the invention. In this example the factor K is 0.515 and the open circuit dc output voltage is given by:

$$V_{DO} = 2.41\ V_N$$

DESCRIPTION OF THE INVENTION

The invention relates to multipulse converter arrangements of the 12-pulse type using a special tapped wye-connected auto-transformer with double-wound secondary windings connected in delta. The tapped wye connection provides for step-up or step-down of the three-phase output voltages of which two sets are provided, one at the tapping on the wye connections and another set at the corners of the delta connection. Because of the electrical isolation provided by the transformer windings the two sets of three-phase voltage can be used to power two three-phase converters connected in series. The capability of setting the dc output voltage during design or by means of adjustable tappings to accommodate normal supply voltage and loading variations also allows inclusion of additional ac line reactance in the ac power source to filter higher harmonic frequencies as necessary. The decision whether to use any additional reactance is a matter of system and component design trade-offs. Higher order harmonic currents drawn from the source by a 12-pulse connection have characteristic frequencies of the form (12k±1) where k is any positive integer, also their amplitude is ideally of the form 1/(12k±1). Practical imperfections in the ac supply source introduce noncharacteristic frequencies which are particularly troublesome in conventional parallel converters, but which have small effect in series converters as in the invention.

Figure 1:
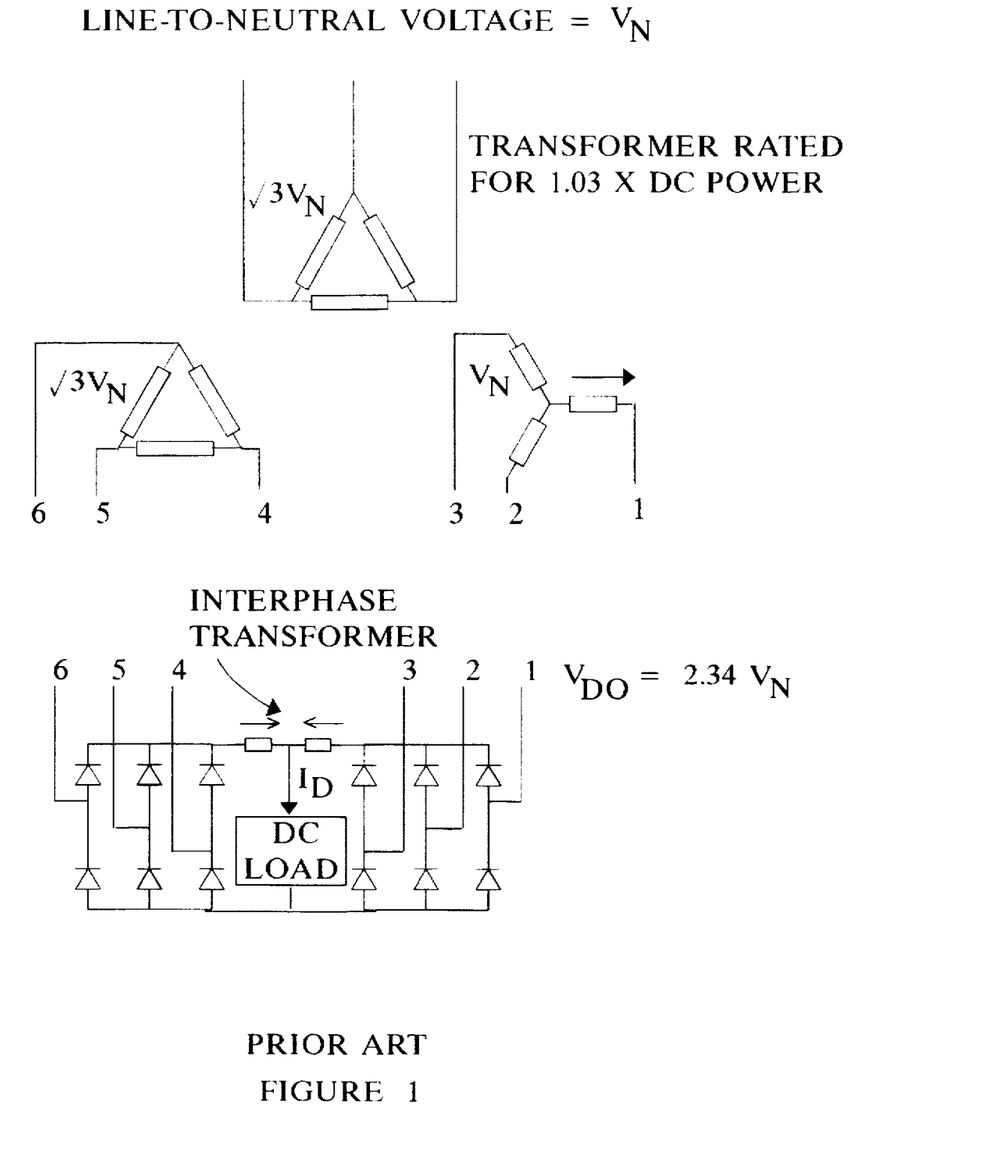
FIG. 1 shows the prior art in the form of a double-wound delta-wye connection which produces fixed-amplitude, phase-shifted power sources for two converter bridges parallelled through an interphase transformer. In this connection the delta/wye transformer is rated for 103% of the dc power load. Any output voltage is feasible by choosing the appropriate turns ration for the transformer.
Figure 2:
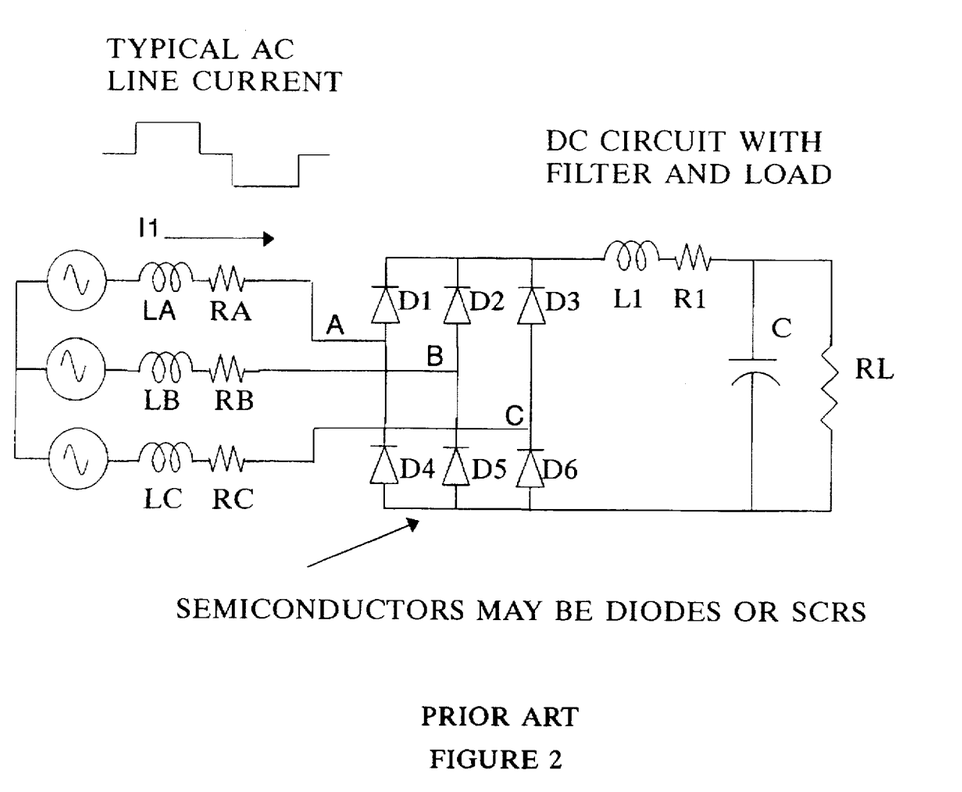

Referring to FIG. 2 a basic three-phase rectifier bridge is shown in which 6 diodes are connected to a three-phase supply and a dc circuit incorporating a load and dc filter components. The open circuit dc output voltage from this circuit is given by:

$$V_{DO}=2.34\ V_N$$

The line current harmonics of this circuit under load are at harmonic frequencies of the form (6k±1) and with amplitude 1/(6k±1) where k is any positive integer.

Figure 4:
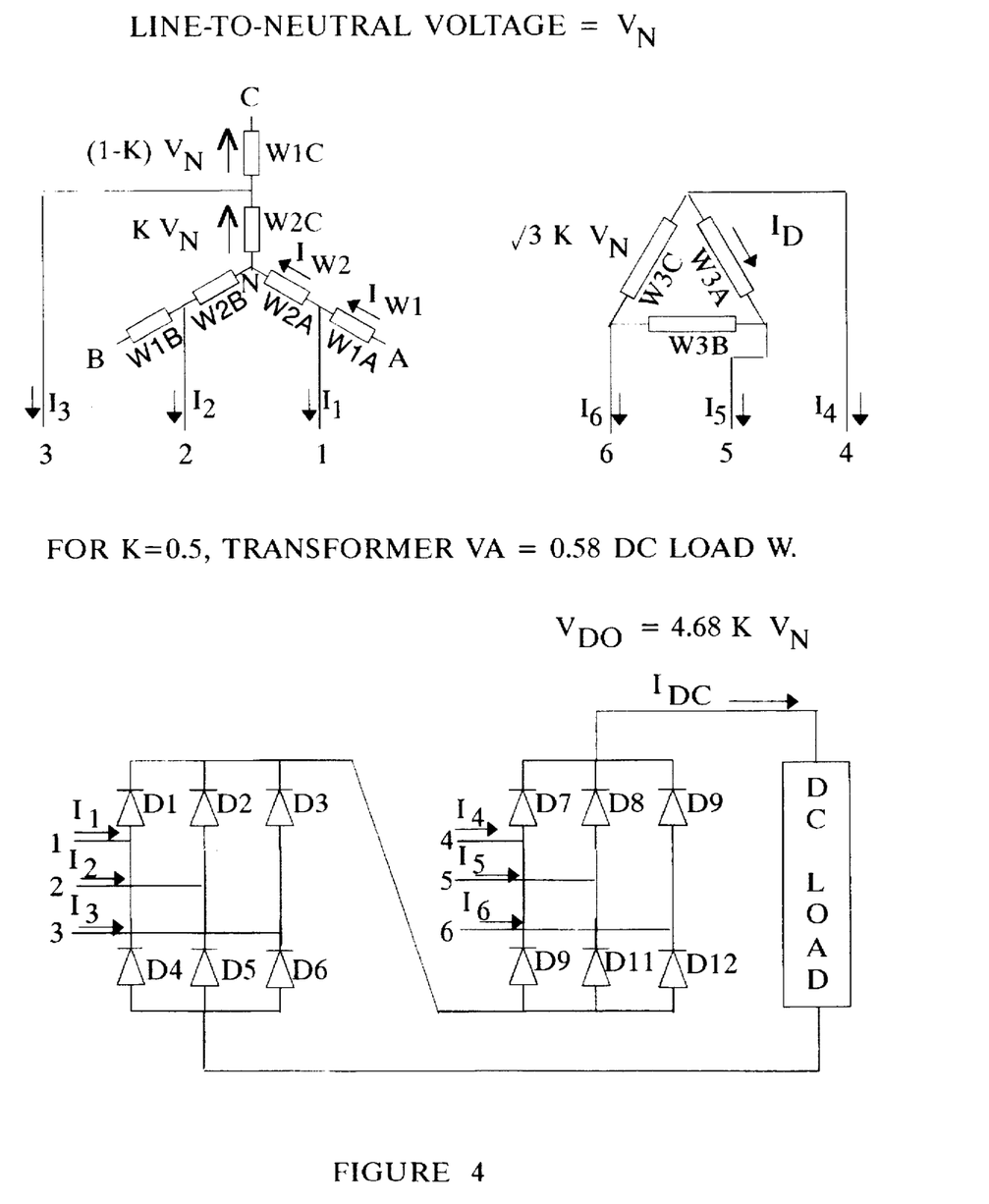

FIG. 4 shows a basic embodiment of the invention connected as a 12-pulse rectifier in which the power source is applied to terminals A, B, and C. This generates two sets of three-phase ac output at terminals 1, 2, 3 and 4, 5, 6. The amplitude of the dc output is dependent upon the tapping of the auto part of the wye transformer and is given by:

$$V_{DO}=4.68\ V_N$$

where $V_{DO}$ is the dc output voltage and $V_N$ is the line to neutral voltage supplied by the ac power source. The phase difference existing between the two three-phase sets of voltage is automatically set at 30° by means of the delta connection of the closed set of windings with terminals 4, 5, and 6.

To determine the currents in each winding it is necessary to solve the circuit equations. This is done as follows:

Referring to FIG. 4

$$I_{w1}=I_{w2}+I_1\ \text{(kirchoffs law)}$$

also $$K\sqrt{3}I_D+K\ I_{w2}+(1-K)I_{w1}=0\ \text{(ampere turn law)}$$

from which, $$I_{w2}=-|K\sqrt{3}\ I_D+(1-K)I_1|\qquad 1$$

From the delta winding $$I_D=(I_5-I_4)/\sqrt{3} \qquad 2$$

Figure 5:
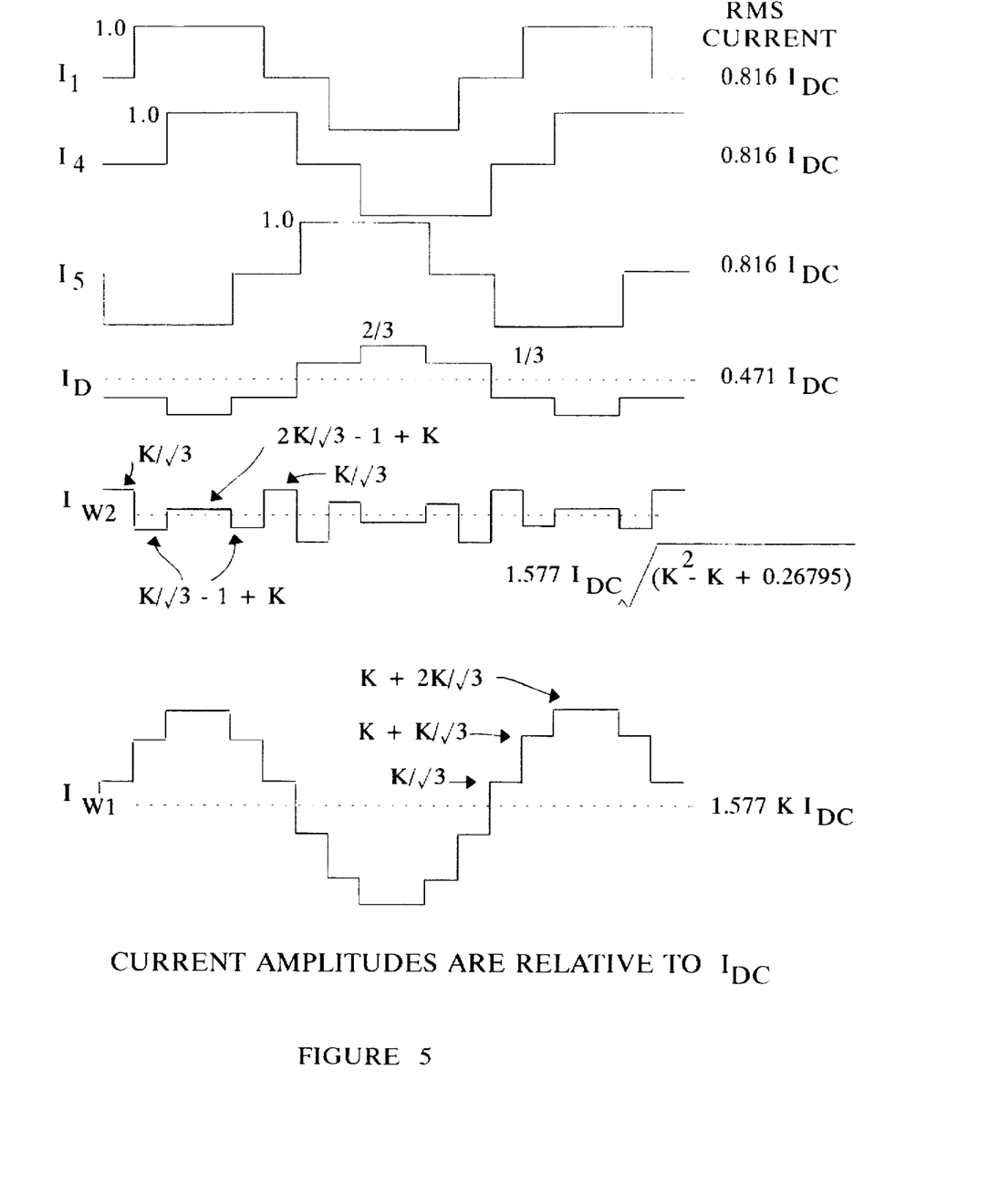
FIG. 5 shows the general waveforms applicable to this invention, from which design performance can be calculated.
Figure 6:
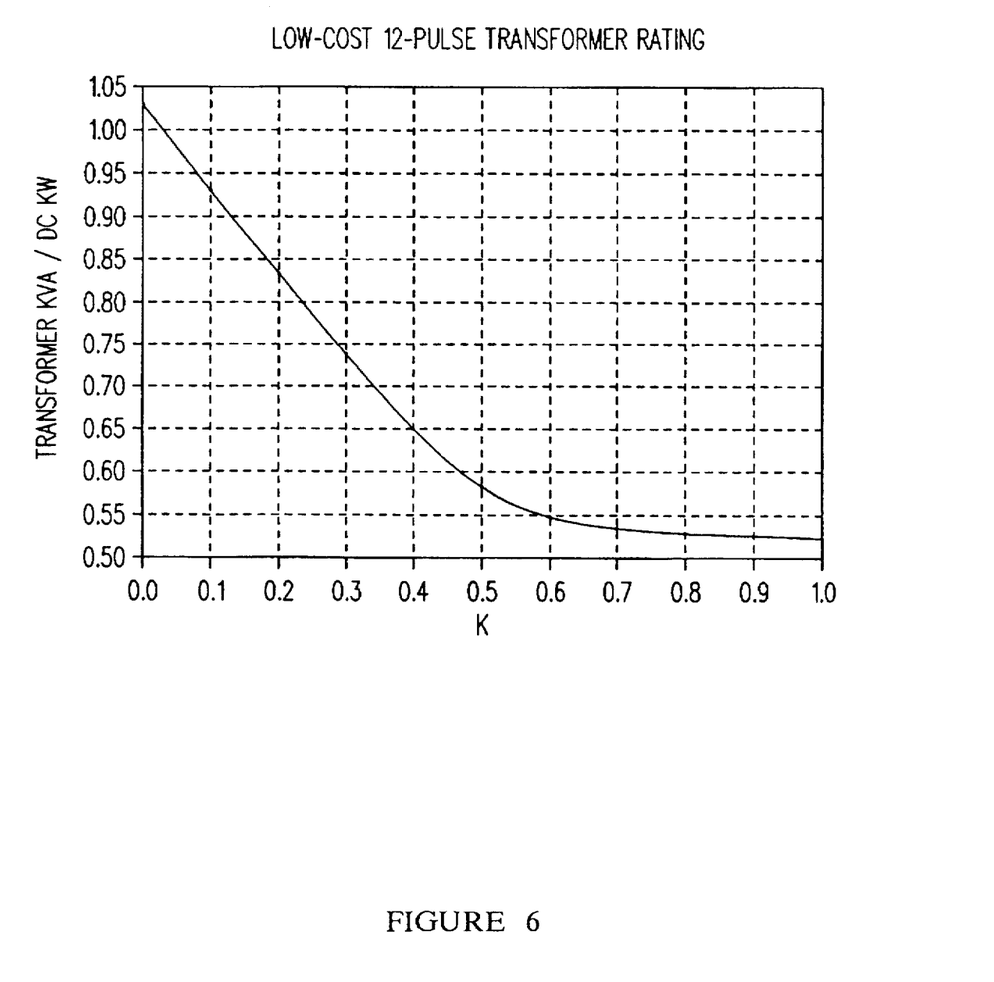
FIG. 6 shows the relationship between transformer rating and total dc load as the design factor K is varied.
Figure 7:
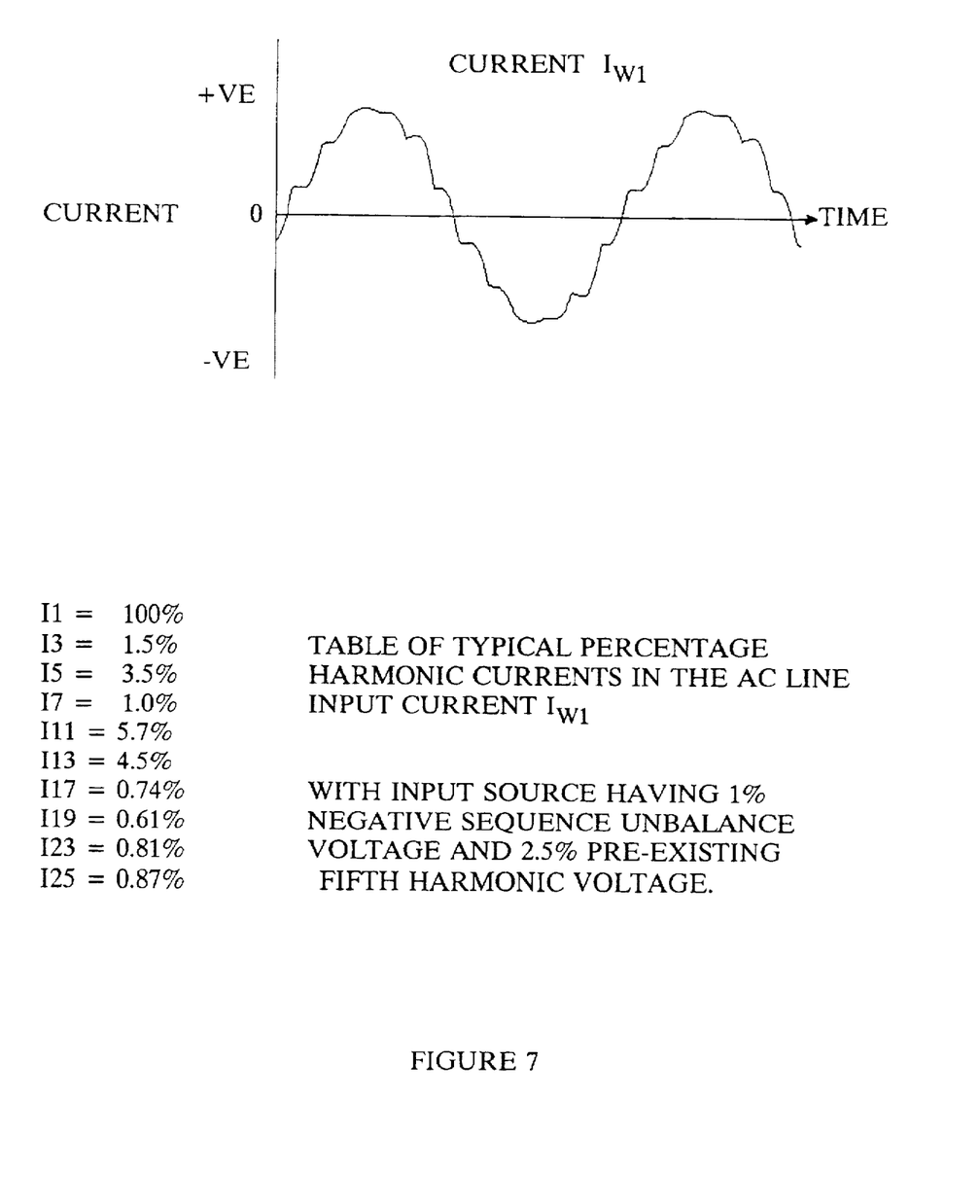

Since the ideal waveforms for $I_1$ through $I_6$ are known, equations 1 and equation 2 can be used to plot the remaining circuit waveforms. This has been done in FIG. 5. The current in the lower half of the wye winding is unusual and is much less than might have been anticipated. It is this result that significantly reduces the transformer KVA rating compared to various topologies of the prior art. The wave shape is due to the interaction between the magnetic and electrical balance equations. The current $I_{w2}$ in the output winding is seen to be much smaller than the currents in the main and delta windings, also this current includes a number of higher frequencies, primarily 5th and 7th harmonics.

The output voltage available is the sum of the outputs of the two bridges namely:

$$V_{DO}=2\times 2.34\ K\ V_N\ \text{i.e.}\ 4.68\ K\ V_N \qquad (3)$$

Residual high frequency harmonics in the current $I_{w1}$ drawn from the ac source can be attenuated as required by incorporating additional inductance in series with the source, i.e. winding $W_1$. Also some attenuation of harmonic currents is feasible by adding extra inductance in series with windings such as $W_2$.

What I claim as my invention is:

1. A multiple AC/DC converter system comprising a three-phase wye connected transformer having a minimum of three windings on each phase with two windings being connected in series to provide a tapped coil with one section of the coil being connected to form a neutral with the same coils from the other phases; with the end of the coil which is remote from the tapping and the neutral being connected to one of the three power source lines; with the same connections on the other phases such that each of the lines of the three-phase source are connected to each transformer phase; with one winding from each phase being connected in series with the same winding from each of the other phases to produce a closed delta connection isolated from the first two windings; wherein the winding electrically connected to the neutral is called the OUTPUT winding; the winding electrically connected to the end of the output winding is called the MAIN winding, the winding connected to form an isolated closed path with other windings is called the DELTA winding; wherein the MAIN winding includes a fraction (1−K) of the sum of the turns in the main and output windings; with the OUTPUT winding including a fraction K of the sum of the turns in the main and output winding; with the DELTA winding incorporating nominally 1.73 times the turns in the OUTPUT winding; wherein the factor K is any positive number not exceeding unity.

2. The system of claim 1 whereby six output voltages of predetermined magnitude and phase angle exist at the connection of the OUTPUT and MAIN windings and at each end of each DELTA winding; whereby the three voltages available at the connection of MAIN and OUTPUT windings are each connected to the center point of a separate pair of series connected semiconductor rectifying elements in which the anode of one element is connected to the cathode of another element, wherein the three cathode terminals of each pair of rectifying elements are connected together to form a first positive terminal and the three anode terminals of each pair of rectifying elements are connected together to form a first negative terminal; wherein the three voltages available at the points of connection of the delta windings are each connected to the center point of a separate pair of series connected semiconductor rectifying elements in which the anode of one element is connected to the cathode of another element; wherein the three cathode terminals of each pair of said rectifying elements are connected together to form a second positive terminal and the three anode terminals of each pair of rectifying elements are connected together to form a second negative terminal; wherein the first positive terminal is connected to the second negative terminal and a dc output is available between the second positive terminal and first negative terminal which is the sum of the dc outputs available between the first positive and first negative terminals and between the second positive and second negative terminals.

3. The system of claim 2 wherein the second positive terminal is connected to the first negative terminal to produce a dc output between the first positive terminal and second negative terminal.

4. The system of claim 2 wherein the semiconductors between first positive and first negative terminals are semiconductor diodes and the semiconductors between second positive and second negative terminals are gate-controlled thyristors or where the semiconductors between first positive and first negative terminals are gate-controlled thyristors and the semiconductors between second positive and second negative terminals; are diodes.

5. The system of claim 2 with additional inductance included in series with each MAIN winding.

6. The system of claim 2 with additional inductance included in series with each OUTPUT winding.

* * * * *